United States Patent [19]

Stone

[11] Patent Number: 4,623,373

[45] Date of Patent: Nov. 18, 1986

[54] TECHNIQUE FOR FABRICATING A GAS-IN-GLASS FIBER

[75] Inventor: Julian Stone, Rumson, N.J.

[73] Assignee: AT&T Bell Laboratories, Murray Hill, N.J.

[21] Appl. No.: 702,387

[22] Filed: Feb. 15, 1985

[51] Int. Cl.$^4$ .............................................. C03B 37/01
[52] U.S. Cl. ......................................... 65/2; 65/30.1; 65/32
[58] Field of Search ............................. 422/211, 236; 206/213.1; 65/2, 30.1, 157, 32

[56] References Cited

U.S. PATENT DOCUMENTS

| | | | |
|---|---|---|---|
| 1,648,657 | 11/1927 | Mock | 206/213.1 |
| 2,342,406 | 2/1944 | Latta | 206/213.1 X |
| 3,715,189 | 2/1973 | Nighohossian | 422/236 X |
| 3,770,350 | 11/1973 | Stone et al. | 356/75 |
| 4,033,668 | 7/1977 | Presby | 350/96 |
| 4,203,744 | 5/1980 | Schultz | 65/30.1 X |
| 4,374,091 | 2/1983 | Reiss | 422/211 X |
| 4,515,612 | 5/1985 | Burrus et al. | 65/3.12 |

FOREIGN PATENT DOCUMENTS 58-204832  11/1983  Japan ................................... 65/2

OTHER PUBLICATIONS

The Journal of Chem. Physics, vol. 38, No. 2, Jan. 15, 1963, Lee, pp. 448–455.
Journal Appl. Phys., vol. 43, No. 4, Apr. 1972, Schackelford et al., pp. 1619–1626.
Journal Appl. Phys., vol. 50, No. 8, Aug. 1979, Shelby et al., pp. 5533–5535.
Electronic Letters, vol. 18, No. 2, Jan. 21, 1982, Stone et al., pp. 78–80.
Optics Letters, vol. 7, No. 6, Jun. 1982, Stone et al., pp. 297–299.
Optics Letters, vol. 9, No. 6, Jun. 1984, Chraplyvy et al., pp. 241–242.
IEE Coll. of Implementation & Reliability of Opt. Fiber Links, Jun. 11–12, 1984, 3 pages, Marshall et al.

Primary Examiner—Kenneth M. Schor
Attorney, Agent, or Firm—Erwin W. Pfeifle

[57] ABSTRACT

The present invention relates to a technique for infusing and maintaining a gas-in-glass fiber. In the present technique, a length of an optical fiber, e.g., a single mode fiber, is placed in a pressure vessel with the ends of the fiber protruding from the vessel walls through seals. The vessel is then partially or fully filled with a medium, such as a gas or water, and the vessel sealed. In one embodiment, a container, including both the predetermined gas under pressure and a rupture disc in a container wall, is disposed within the vessel. Pressure is then applied to the sealed vessel until the rupture disc implodes and releases the gas for subsequent infusion. In a second embodiment, the predetermined gas is introduced into the vessel from an outside pressurized source until a first predetermined pressure is obtained within the vessel. A predetermined amount of additional pressure from a second pressure source is then supplied to the vessel until a second predetermined pressure is reached in the vessel. Once the final pressure is achieved by either embodiment, the vessel is maintained in this state.

10 Claims, 2 Drawing Figures

TECHNIQUE FOR FABRICATING A GAS-IN-GLASS FIBER

TECHNICAL FIELD

The present invention relates to technique for fabricating a gas-in-glass fiber infused with a predetermined gas such as, for example, deuterium or hydrogen. More particularly, a length of a single-mode optical fiber is placed in a pressure vessel with its ends protruding through seals in the walls, the vessel is either partially or fully filled with a predetermined liquid or gas either before or after the vessel is sealed, and the pressure is increased in the vessel to achieve a final predetermined pressure. The predetermined gas to be infused in the fiber is introduced under pressure into the sealed vessel either from an external source prior to application of the pressure step or via a vial including the gas and a rupture disc which implodes when the final pressure is reached to release the gas.

DESCRIPTION OF THE PRIOR ART

It is well known that both hydrogen and deuterium diffuse readily in vitreous silica, and that at elevated temperatures, as well as under other conditions, e.g., irradiation with energetic electromagnetic radiation, deuterium can undergo an exchange reaction with hydrogen for converting OH to OD. In this regard see, for example, the articles "Diffusion of Hydrogen in Natural and Synthetic Fused Quartz" by R. W. Lee in *The Journal of Chemical Physics*, Vol. 38, No. 2, Jan. 15, 1963, at pages 448–455; and "Radiation Induced Isotope Exchange in Vitreous Silica" by J. E. Shelby et al in *Journal of Applied Physics*, Vol. 50, No. 8, August 1979, at pages 5533–5535. These techniques have been used to, for example, reduce the attenuation in a fiber due to absorption by impurities present in the guiding region of the fiber. In this regard see, for example, the article "Reduction of Loss Due to OH In Optical Fibers By A Two-Step OH→OD Exchange Process" by J. Stone et al. in *Electronic Letters*, Vol. 18, No. 2, Jan. 21, 1982, at pages 78–80.

The problem in the prior art is to provide a convenient technique for infusing and maintaining a predetermined gas in a gas-in-glass fiber for providing, for example, a gas-in-glass fiber laser.

SUMMARY OF THE INVENTION

The foregoing problem has been solved in accordance with the present invention which relates to a technique for infusing and maintaining a length of an optical fiber with a predetermined gas such as, for example, hydrogen, nitrogen or deuterium.

It is an aspect of the present invention to provide a technique for fabricating a gas-in-glass fiber infused and maintained with a predetermined gas such as, for example, hydrogen, nitrogen or deuterium. More particularly, a length of a single-mode optical fiber is placed in a pressure vessel with its ends protruding through seals in the walls, and the vessel is partially or fully filled with a medium, such as gas or water. Pressure is then increased within the vessel to achieve a final predetermined pressure. The predetermined gas, under pressure, to be infused in the fiber is introduced into the sealed vessel either from an external source prior to the application of the pressure step, or via a container including both the gas to be infused and a rupture disc which implodes when the final predetermined pressure is reached to release the gas. The released gas is then infused into the surrounding medium and the fiber.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
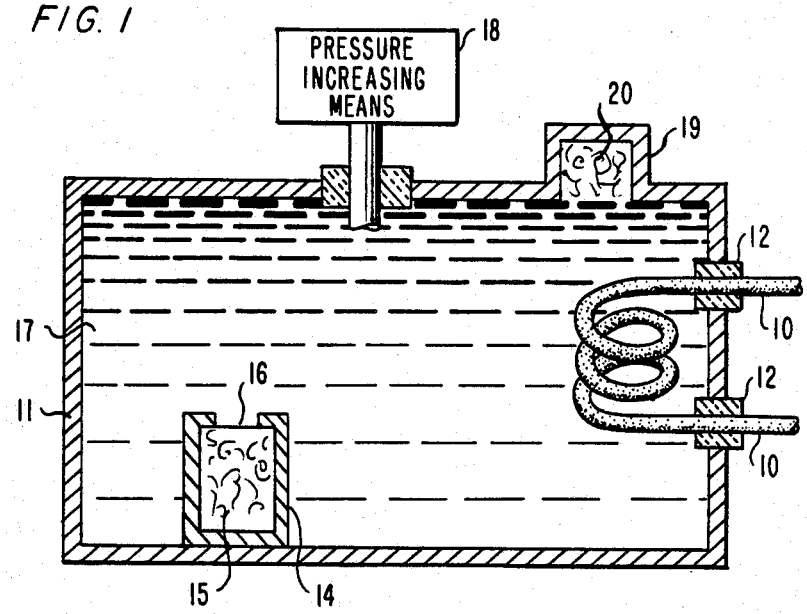
FIG. 1 is a view in cross-section of an arrangement in accordance with the present invention for infusing and maintaining a predetermined gas in a length of optical fiber.

FIG. 1 is a view in cross-section of an arrangement in accordance with the present invention for infusing and maintaining a predetermined gas, such as, for example, hydrogen, nitrogen or deuterium, in a length of a single-mode optical fiber. In FIG. 1, a predetermined length of an optical fiber 10 is disposed within a pressure vessel 11 such that the ends of fiber 10 protrude through seals 12 in at least one wall of pressure vessel 11. A container 14 containing a pressurized volume of the predetermined gas 15 to be infused into the fiber, and an implosion-type rupture disc 16 in a wall thereof, is placed in vessel 11. Vessel 11 is then completely filled with a medium 17 as, for example, water or gas and sealed. Since the solubility of a gas in water is very low, and since water is both economical and easy to obtain, it is preferable that water be used for medium 17 for practicing the present technique. For purposes of explanation hereinafter, it will be assumed that medium 17 is water.

A pressure-increasing means 18 is then activated for increasing the hydrostatic pressure in vessel 11 to a predetermined value which causes rupture disc 16 to implode and release gas 15 into vessel 11. Since a liquid, as water, is incompressible, the pressure can be increased easily. Once the gas is released it will diffuse everywhere in vessel 11 at a pressure close to the original pressure in container 14. The gas will diffuse into both liquid 17 and fiber 10 at the RT diffusion rate until solubility equilibrium is reached in both the fiber and liquid. When equilibrium is achieved, the system should remain that way unless the gas finds a way to leave the system.

Since seals 12 would be the primary element to provide possible leakage, it is recommended that seals 12 be of a type to accommodate the necessary hydrostatic pressure without leaking either liquid or gas. Hermetic seals can be achieved, for example, by metallizing the surface of fiber 10 in the area to be sealed, and then soldering the fiber in place for a leak-proof gas-tight seal as taught, for example, in U.S. Pat. No. 4,033,668 issued to H. M. Presby on July 5, 1977. Even with a very minute leak, the effect would be very slow if an optional small reservoir 19 of undissolved gas 20, corresponding to gas 15 to be infused, is provided and maintained. The means 18 to increase the pressure in vessel 11 can comprise any suitable device such as a pump or plunger which in turn can move a diaphram seal to reduce the volume in vessel 11.

Figure 2:
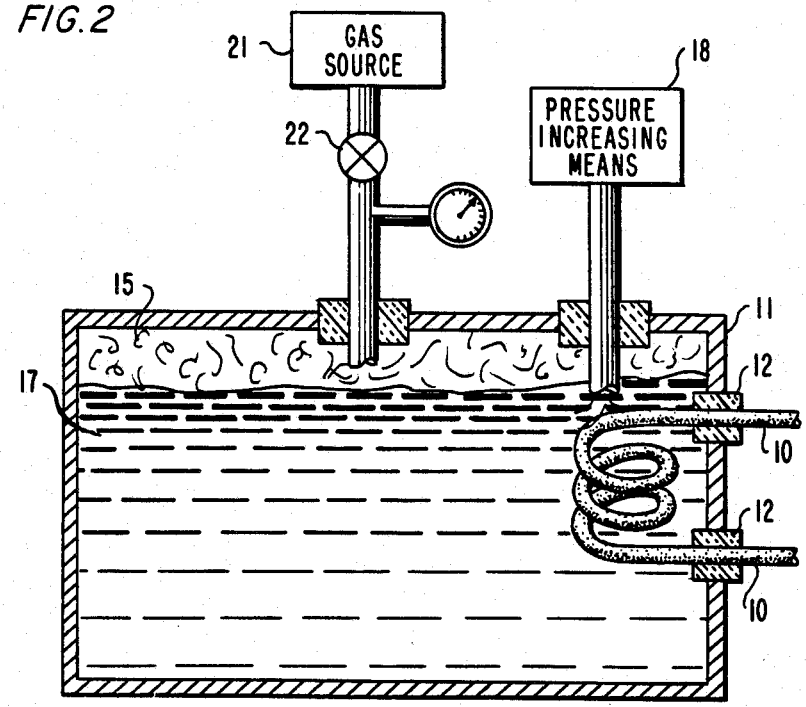
FIG. 2 is a view in cross-section of an alternative arrangement in accordance with the present invention for infusing and maintaining a predetermined gas in a length of optical fiber.

FIG. 2 illustrates an alternative arrangement to FIG. 1 for infusing and maintaining a predetermined gas-in-glass fiber. In the arrangement of FIG. 2, a length of fiber 10 is disposed in a vessel 11 through seals 12 as in FIG. 1. Vessel 11 is then partially filled with a medium 17, water for purposes of explanation, to cover fiber 10 and the vessel is sealed with the remaining space above the water containing the predetermined gas. The predetermined gas 15, such as deuterium, nitrogen or hydrogen, is introduced from a gas source 21 into vessel 11 until a predetermined pressure is reached in vessel 11 and the supply shut off via a valve 22. A pressure increasing means 18 is then (a) activated to increase the pressure in vessel 11 to a desired value and (b) locked down to maintain such pressure. The infusion of the gas 15 into both liquid 17 and fiber 10 proceeds as described hereinbefore for the arrangement of FIG. 1. The advantage of the arrangement of FIG. 2 is that all the preparation can be performed at a selected pressure, e.g., atmospheric pressure, before the vessel is sealed. Then the predetermined gas 15 is introduced to a first pressure and the pressure-increasing means 18, e.g., a plunger, compressed to provide the additional pressure to achieve the desired final pressure. The advantage of the arrangement of FIG. 1 is that no gas handling or high pressure is required, provided a pressurized gas container is supplied. Such container could comprise, for example, a small vial of deuterium at a pressure of 7500 psi or greater. Either arrangement, however, allows the pressure vessel to be left at room temperature after the predetermined gas has been infused.

It is to be understood that the abovedescribed embodiments are simply illustrative of the principles of the present invention. Various other modifications and changes may be made by those skilled in the art which will embody the principles of the present invention and fall within the spirit and scope thereof. For example, the pressure vessel could be filled with a gas instead of a liquid 17 provided seals are used which are non-permeable. A disadvantage of using a gas instead of a liquid is the large volume reduction after filling that would occur to obtain a high pressure. The present invention can be used in instruments called "Optical Time Domain Reflectometers" for measuring characteristics, e.g., loss or fault location, of optical fibers. Present reflectometers generally measure characteristics over maximum optical fiber lengths of 72 km, whereas the present arrangement, when incorporated in a reflectometer, has already permitted lengths of 100 km to be tested, with greater test lengths anticipated.

What is claimed is:

1. A method of making and maintaining a gas-in-glass fiber, the method comprising the steps of:
    (a) disposing a predetermined length of an optical fiber within a pressure vessel with the ends of the fiber protruding through seals in a least one wall of the pressure vessel;
    (b) disposing a container within the pressure vessel, the container containing a predetermined gas to be infused into the fiber which is at a high predetermined pressure, and the container comprising a rupture disc in a wall thereof;
    (c) sealing the pressure vessel; and
    (d) pressurizing the vessel to a predetermined pressure which is sufficiently high such that (1) the rupture disc in the wall of the gas container implodes and releases the gas into the pressure vessel, and (2) the gas is infused into the fiber and produces a predetermined concentration of the gas molecules therein to form a gas-in-glass fiber Raman laser.

2. The method according to claim 1 wherein the optical fiber used in step (a) is a length of single mode fiber.

3. The method according to claim 2 wherein the container of step (b) contains deuterium.

4. The method according to claim 2 wherein the container of step (b) contains hydrogen.

5. The method according to claim 2 wherein the container of step (b) contains nitrogen.

6. The method according to claim 2, 3, 4, or 5 wherein step (c) further includes filling the pressure vessel with a predetermined medium comprising either one of a liquid or gas, either before or after sealing the pressure vessel.

7. The method according to claim 6 wherein in step (c) the pressure vessel is filled with water.

8. The method according to claim 1 wherein the container in step (b) contains deuterium.

9. The method according to claim 1 wherein the container of step (b) contains hydrogen.

10. The method according to claim 1 wherein the container of step (b) contains nitrogen.

* * * * *